United States Patent
Cakmakci et al.

(10) Patent No.: US 12,147,039 B2
(45) Date of Patent: Nov. 19, 2024

(54) FREEFORM LENS WITH INTEGRATED LIGHTGUIDE AND METHOD OF MANUFACTURE

(71) Applicant: GOOGLE LLC, Mountain View, CA (US)

(72) Inventors: Ozan Cakmakci, Sunnyvale, CA (US); Omar David Negrete, San Francisco, CA (US); Yi Qin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 17/317,105

(22) Filed: May 11, 2021

(65) Prior Publication Data

US 2022/0269081 A1 Aug. 25, 2022

Related U.S. Application Data

(60) Provisional application No. 63/030,578, filed on May 27, 2020.

(51) Int. Cl.
| | | |
|---|---|---|
| *G02B 27/01* | (2006.01) | |
| *F21V 8/00* | (2006.01) | |
| *G02C 7/02* | (2006.01) | |
| *G02C 11/00* | (2006.01) | |

(52) U.S. Cl.
CPC ....... *G02B 27/0172* (2013.01); *G02B 6/0013* (2013.01); *G02B 6/0033* (2013.01); *G02B 6/0065* (2013.01); *G02C 7/02* (2013.01); *G02C 11/10* (2013.01); *G02B 2027/0178* (2013.01)

(58) Field of Classification Search
CPC .............. G02B 27/0172; G02B 6/0013; G02B 6/0033; G02B 6/0065; G02B 2027/0178; G02B 6/0016; G02B 6/0031; G02B 6/0036; G02B 6/0056; G02B 2027/011; G02C 7/02; G02C 11/10; G02C 7/086
See application file for complete search history.

(56) References Cited

U.S. PATENT DOCUMENTS

| | | | |
|---|---|---|---|
| 10,338,390 B2 | 7/2019 | Cakmakci et al. | |
| 10,677,966 B1* | 6/2020 | Ouderkirk | G02B 27/4272 |
| 2017/0010465 A1* | 1/2017 | Martinez | G02B 27/017 |
| 2017/0363870 A1* | 12/2017 | Cakmakci | G02B 27/0172 |

(Continued)

FOREIGN PATENT DOCUMENTS

DE 102011007812 B4 * 2/2018 ......... G02B 27/0172

OTHER PUBLICATIONS

Machine translation of DE102011007812B4 (Year: 2018).*

*Primary Examiner* — Darryl J Collins
*Assistant Examiner* — Matthew Y Lee

(57) ABSTRACT

A head mounted display (HMD) device and method of manufacturing the same. The HMD includes a frame housing a micro-display to project display light, a lightguide configured to receive the display light from the micro-display, and a corrective layer having a world-side surface coupled to the eye-side surface of the lightguide. The lightguide is further configured to have a world-side surface with a radius of curvature based on an ophthalmic corrective prescription and an eye-side surface having an outcoupler feature formed thereon such that the coupled lightguide and corrective layer form a lens configured to fit within the frame.

20 Claims, 4 Drawing Sheets

(56) References Cited

U.S. PATENT DOCUMENTS

2018/0292676 A1* 10/2018 Alexander ............. G02C 7/086
2019/0278086 A1*  9/2019 Ofir ........................ G02B 6/122
2020/0096772 A1*  3/2020 Adema ................ G02B 6/0016
2021/0181533 A1*  6/2021 Kim ....................... G02C 7/088

* cited by examiner

FREEFORM LENS WITH INTEGRATED LIGHTGUIDE AND METHOD OF MANUFACTURE

CROSS-REFERENCE TO RELATED APPLICATIONS

The present application claims priority to U.S. Provisional Patent Application Ser. No. 63/030,578, entitled "Curved Lightguide with Integrated Prescription Support", and filed on May 27, 2020, the entirety of which is incorporated by reference herein.

BACKGROUND

In the field of optics, a combiner is an optical apparatus that combines two light sources, for example, light transmitted from a micro-display and directed to the combiner via a lightguide, and environmental light from outside of the combiner. Optical combiners are used in heads up displays (HUDs), sometimes referred to as head mounted displays (HMDs) or near-eye displays, which allow a user to view computer-generated content (e.g., text, images, or video content) superimposed over a user's environment viewed through the HMD, creating what is known as augmented reality (AR). In some applications, an HMD is implemented in an eyeglass frame form factor with the optical combiner forming at least one of the lenses within the eyeglass frame. The HMD enables a user to view the computer-generated content without having to significantly shift his or her line of sight. Conventional near-to-eye displays are not well suited for users that require ophthalmic corrective lenses as HMDs can physically interfere with conventional prescription corrective glasses because they are necessarily worn close to a user's eye, thus limiting the vertex distance available for both corrective and display components.

BRIEF DESCRIPTION OF THE DRAWINGS

The present disclosure can be better understood, and its numerous features and advantages made apparent to those skilled in the art by referencing the accompanying drawings. The use of the same reference symbols in different drawings indicates similar or identical items.

DETAILED DESCRIPTION

Figure 1:
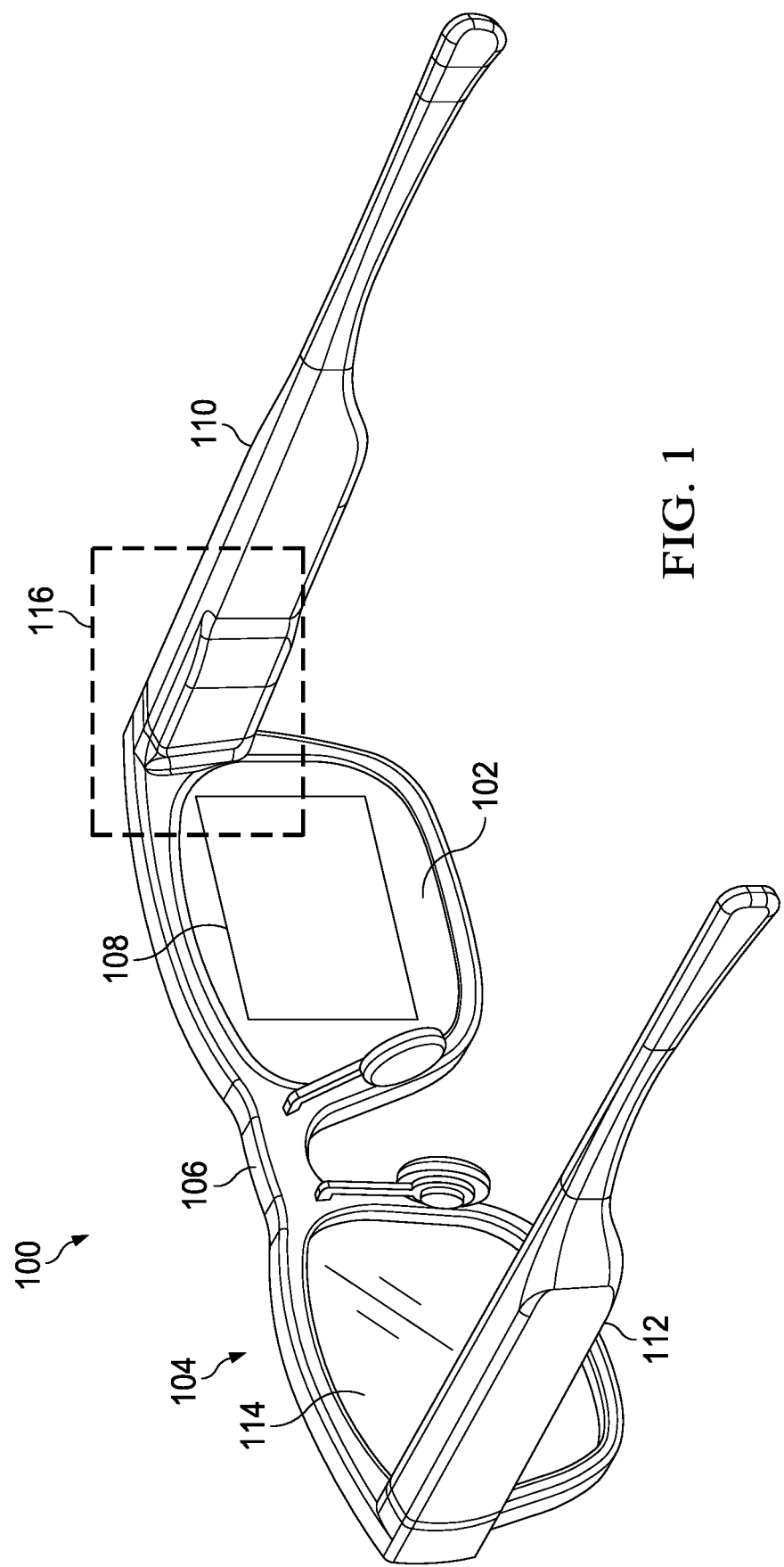
FIG. 1 illustrates a display system employing a lens that functions as an optical combiner, in accordance with some embodiments.

Conventional methods for including a corrective optical prescription in an HMD generally require configuring the optical combiner to accommodate both a lightguide and a separate prescription lens, either as part of eye-glasses worn by the user or as a lens that is inserted into, or attached to, an optical combiner of the HMD. The result is often a bulky system that can be uncomfortable for a user to wear, thus detracting from the user experience. Further, boundary lines of a corrective prescription lens included in a combiner as an insert or attachment are often visible to the user, which also detracts from the user experience.

There are also complications in simultaneously correcting both the light from within the combiner and the environmental light such that a user does not experience optical aberrations when viewing an augmented reality scene. For example, if a corrective lens is positioned on the world-facing side (i.e., the side facing away from a user) of an optical combiner, then light representing the computer-generated content, which is traveling within the combiner, does not receive any prescriptive correction and will appear out of focus to the user. Further, if a corrective lens is positioned over the eye-ward side (i.e., the side facing towards a user) of an optical combiner, the thickness of the prescription lens is limited by the vertex distance (i.e., the space available between the combiner and the user's eye). This is because a stronger prescription (i.e., larger diopter) requires the corrective lens to be thicker, whether at the edges of the lens (as in nearsighted vision correction) or in the center of the lens (as in farsighted vision correction), which can potentially bump into a user's cheek or eyelashes.

Using the techniques described herein, a corrective prescription lens is formed that includes an integrated lightguide. The resulting prescription lens and lightguide form an optical combiner that can be used to display images in an HMD. This integration reduces the bulk and weight of the HMD, in addition to providing a way of forming a combiner using commonly available optical cutting and grinding machinery. One challenge of integrating the corrective prescription is that, while combiners can be formed from the same material typically used in the manufacturing of prescription lenses, such as, for example, optical grade polycarbonate plastic or a urethane-based monomer material, the optical combiner also includes specialized layers and features to facilitate the transmission of light from a light source, through a volume of the combiner, and then out of the combiner towards a user's eye. Using the techniques disclosed herein, a prescription lens with an integrated lightguide can be formed from two components (i.e., discs of optical material), one of which includes features that facilitate incoupling of light into the lightguide and outcoupling of the light from the lightguide towards a user's eye. The techniques disclosed herein also allow for use of a limited number of pre-molded parts possessing attributes that, when combined, accommodate a specified range of prescription diopters, thus reducing inventory of pieces for assembly and increasing efficiency in the manufacturing process.

Prescription eyeglasses lenses have two curved surfaces of consequence to the vision of the wearer: the eye-side surface and the world-side surface. The corrective power of a lens is determined by adding the optical power of the "eye-side" surface (i.e., the major surface of the lens closest to the user's eye) and the optical power of the "world-side" surface (i.e., the major surface closest to the user's environment and farthest from the user's eye). For any given corrective power, an infinite number of curve combinations may be used to achieve the same result. Prescription lenses for eyeglasses are typically made from a pre-formed disk of polycarbonate plastic, called a "blank", with one side being flat and the other side having a convex curvature corresponding to the base curvature best suited to a user's specific prescription. The pre-formed base curvature, of what will become the world-side of the final lens, provides a reference curvature from which the eye-side curvature is calculated in order to attain the user's prescription. Material from the flat side is then cut or ground away utilizing specialized equipment to form the eye-side curvature, which when combined with the world-side curvature achieves a user's corrective prescription diopter. The edges of the resulting lens are then shaped to fit into a frame to be worn by the user.

FIGS. 1-4 illustrate embodiments of a prescription lens that includes an integrated lightguide and methods of manufacturing the same. A prescription lens with an integrated lightguide can be manufactured in much the same way as a conventional eyeglass lens utilizing specialized components. For example, by creating a "blank" formed from layers of material having specialized coatings and/or embedded physical features and then cutting either or both the eye-side and world-side surfaces of the blank according to the specific curvatures called for by a user's prescription, a lens is formed such that a portion of the lens acts as a lightguide. In some embodiments, the blank is formed from at least two pieces of optical material, at least one of which is machined to include an outcoupler feature (or "combiner surface"). The pieces are bonded together to form the blank, the eye-side and world-side of which can be cut into freeform curvatures to achieve a user's corrective prescription. The edges of the resulting optical combiner/prescription lens can then be shaped to fit into an HMD or other near-to-eye display system. In some embodiments, the two pieces of optical material to be bonded are molded to include certain features, such as the outcoupler feature or an eye-side curvature, before they are bonded to reduce the amount of machining to finalize the lens. By using combinations of pre-formed pieces to form blanks, a wide variety of prescriptions can be achieved with fewer pieces than if blanks were molded for each possible prescription.

FIG. 1 illustrates an example display system 100 employing an optical combiner 102 in accordance with some embodiments having support structure 104 that includes a frame 106, which houses a micro-display configured to project images toward the eye of a user, such that the user perceives the projected images as being displayed in a field of view (FOV) area 108 at the combiner 102. Support structure 104 also includes components to allow the support structure 104 to be worn in a position in front of a user's eyes. Examples of such components are arms 110 and 112 to be supported by a user's ears. A strap, or straps (not shown), configured to be worn around and/or on top of a user's head may be used in place of one or more of the arms in some embodiments to secure the support structure 104 in front of a user's eyes. In some embodiments, the display system 100 is symmetrically configured such that lens element 114 is also a combiner and a micro-display is housed in the portion of the frame 106 proximate to arm 112 to project images to a FOV area within lens element 114. Either or both of combiner 102 and lens element 114 can be configured with eye-side and world-side surfaces having curvatures that, together, provide prescription correction of light that is transmitted to a user's eye(s).

In the depicted example, the display system 100 is a near-eye display system in the form of an HMD in which the support structure 104 is configured to be worn on the head of a user and has a general shape and appearance (or "form factor") of an eyeglasses frame. The support structure 104 contains or otherwise includes various components to facilitate the projection of such images toward the eye of the user, such as a micro-display and field lens, which are described in greater detail below with reference to FIG. 2. In some embodiments, the support structure 104 further includes various sensors, such as one or more front-facing cameras, rear-facing cameras, other light sensors, motion sensors, accelerometers, and the like. The support structure 104 further can include one or more radio frequency (RF) interfaces or other wireless interfaces, such as a Bluetooth™ interface, a WiFi interface, and the like. Further, in some embodiments, the support structure 104 further includes one or more batteries or other portable power sources for supplying power to the electrical and processing components, such as one or more processors of a processing system, of the display system 100. In some embodiments, some or all of these components of the display system 100 are fully or partially contained within an inner volume of support structure 104, such as within arm 110 and the portion of the frame 106 in region 116 of the support structure 104. It should be noted that while an example form factor is depicted, it will be appreciated that in other embodiments the display system 100 may have a different shape and appearance from the eyeglasses frame depicted in FIG. 1.

In the depicted embodiment, combiner 102 is used by the display system 100 to provide an augmented reality (AR) display in which rendered graphical content can be superimposed over or otherwise provided in conjunction with a real-world view as perceived by the user through combiner 102. For example, light used to form a perceptible image or series of images may be projected by a micro-display of the display system 100 onto the eye of the user via a series of optical elements, such as a lightguide formed at least partially in combiner 102 and one or more lenses and/or filters disposed between the micro-display and the lightguide, as is described further below. Optical combiner 102 includes at least a portion of a lightguide that routes display light received by an incoupler of the lightguide to an outcoupler of the lightguide, which outputs the display light toward an eye of a user of the display system 100. In addition, optical combiner 102 is sufficiently transparent to allow a user to see through combiner 102 to provide a field of view of the user's real-world environment such that the image appears superimposed over at least a portion of the real-world environment.

Figure 2:
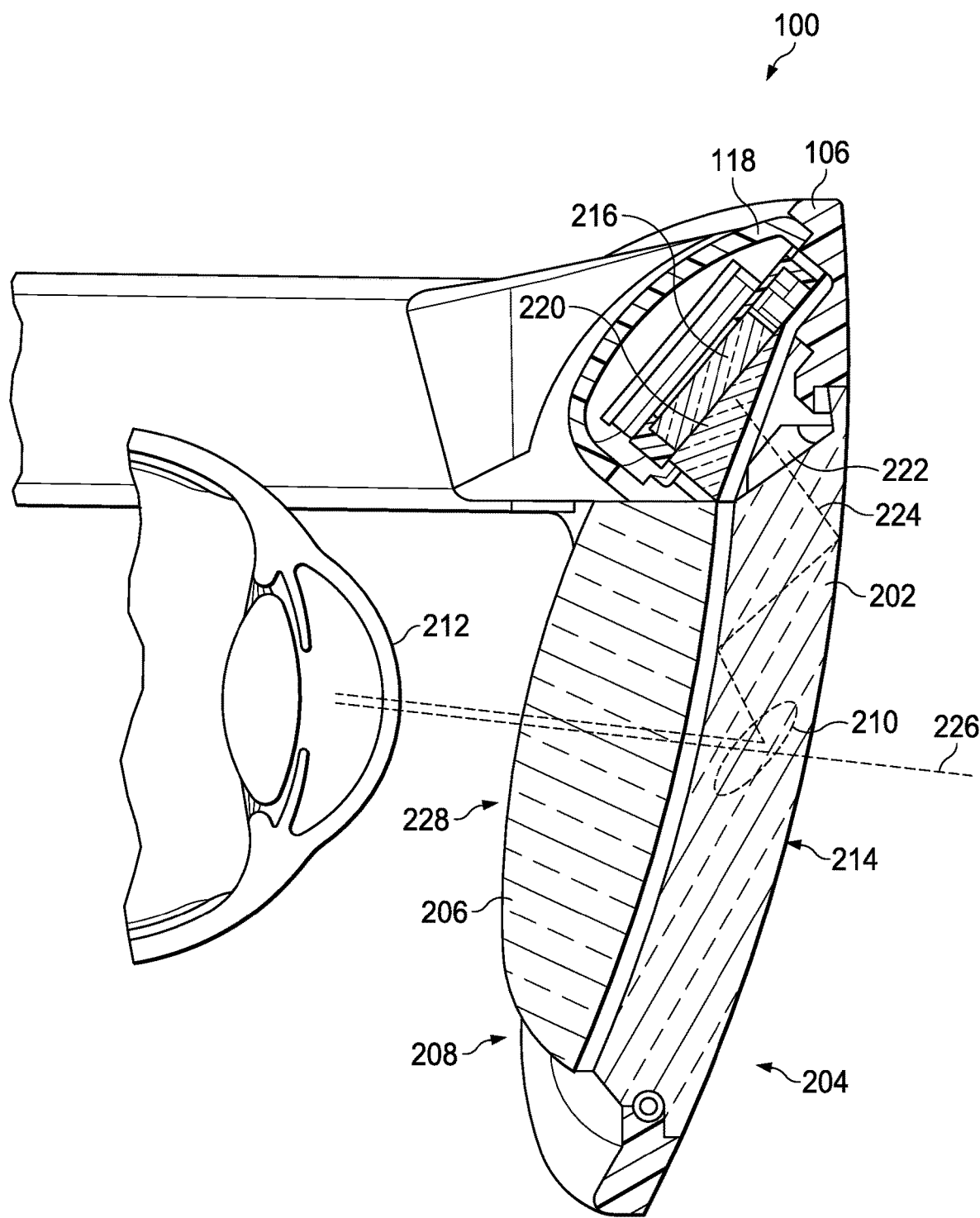
FIG. 2 illustrates a lateral cross-section of the display system of FIG. 1, including a lens mounted within a frame, in accordance with some embodiments.

FIG. 2 illustrates a lateral cross-section of display system 100 including combiner 102 mounted within frame 106 in accordance with at least one embodiment. Combiner 102 includes a lightguide 202 located at the world-side 204 of the combiner 102 and a corrective layer 206 located at the eye-side 208 of the combiner 104. The lightguide 202 is configured to act upon light traveling within the lightguide 202 to change at least one of the direction that the light is traveling, the polarization state of the light, and the angle at which light is refracted or reflected. These changes facilitate conveyance of light within the lightguide 202 to an outcoupler feature 210, where the light is then directed out of the lightguide 202 towards a user's eye 212.

The lightguide 202 is positioned within frame 106 to receive display light from a micro-display 216 mounted within a housing 218 at the top of the frame 106. The micro-display 216 is connected to computing components (not shown) responsible for providing computer-generated content to the micro-display 216. In some embodiments, computer-generated content includes video content, images, or text that is intended to be viewed by a user wearing the display system 100. In some embodiments, light emitted from the micro-display 216 is conveyed through a field lens 220, which acts to align the light in a parallel fashion so that the light has minimal spread as it propagates within the lightguide 202. After traveling through the field lens 220 to correct field aberrations, such as distortion, the light is transmitted into the lightguide 202 at an incoupler feature 222 as display light 224.

In some embodiments, the micro-display 216 is a transmissive display, such as a light-emitting diode (LED) or organic light-emitting diode (OLED) display. In some embodiments, the micro-display 216 is a reflective display, such as a scanning laser projector or a combination of a modulative light source and a dynamic reflector mechanism or digital light processor. The micro-display 216 projects light over a variable area, designated the FOV area 108 (shown in FIG. 1), of the display system 100. The projected area size corresponds to the size of the FOV area 108 and the projected area location corresponds to a region of optical combiner 102 which the FOV area 108 is visible to the user. Generally, it is desirable for a display to have a wide FOV to accommodate the outcoupling of light across a wide range of angles. Herein, the range of different user eye positions that will be able to see the display is referred to as the eyebox of the display.

Coupled to the lightguide 202 is the corrective layer 206, which is shaped to be complementary to the lightguide 202 such that the combined lightguide 202 and corrective layer 206 form combiner 102 having a lens-like shape configured to be mounted within the frame 106 and to provide prescription correction of light transmitted to user's eye 212. As described above, prescription eyeglasses lenses have two curved surfaces of consequence to the vision of the wearer: the eye-side surface and the world-side surface. The corrective power of a lens is determined by adding the radius of curvature of the eye-side surface and the radius of curvature of the world-side surface. For any given corrective power, various curve combinations may be used to achieve the same result. Accordingly, the world-side surface 214 of the lightguide 202 and the eye-side surface 228 of the corrective layer 206 are configured to have curvatures based on a user's corrective prescription. That is, the curvature 232 of the corrective layer and the curvature 230 of the lightguide 202, when taken together, correspond to the diopter of a user's corrective prescription.

The corrective layer 206 is formed from a transparent optical material, such as that used to form the lightguide 202, which allows light from the environment 226 to be transmitted through the combiner 102 such that the light from the environment 226 is combined with display light 224 conveyed from the lightguide 202 to present the user with an image overlaying the user's environment. In some embodiments, other layers of materials, coatings, or features are included on or between the lightguide 202 and the corrective layer 206 to impart the combiner 102 with specific light interaction properties.

In order to present an image for viewing by a user, the micro-display 216 directs light to the field lens 220, which directs the light onto the incoupler feature 222. The incoupler feature 222 directs the light into the lightguide 202 of the combiner 102 as display light 224, which is then conveyed within and along the lightguide 202 via total internal reflection (TIR) to the outcoupler feature 210 of the combiner 102. The outcoupler feature 210 is configured to reflect the display light 224 at an angle less than the critical angle so that the display light 224 is directed out of the combiner 102, through the corrective layer 206, towards a user's eye 212. The combination of display light 224 reflected from the outcoupler feature 210 and environmental light 226 transmitted through the combiner 102 from the world-side 204 create an AR scene viewable by the user. As the display light 224 representing an image and the environmental light 226 both travel through the corrective layer 206, the user will see both the image and the environmental scene in focus. In general, the terms "incoupler feature" and "outcoupler feature" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection.

Figure 3:
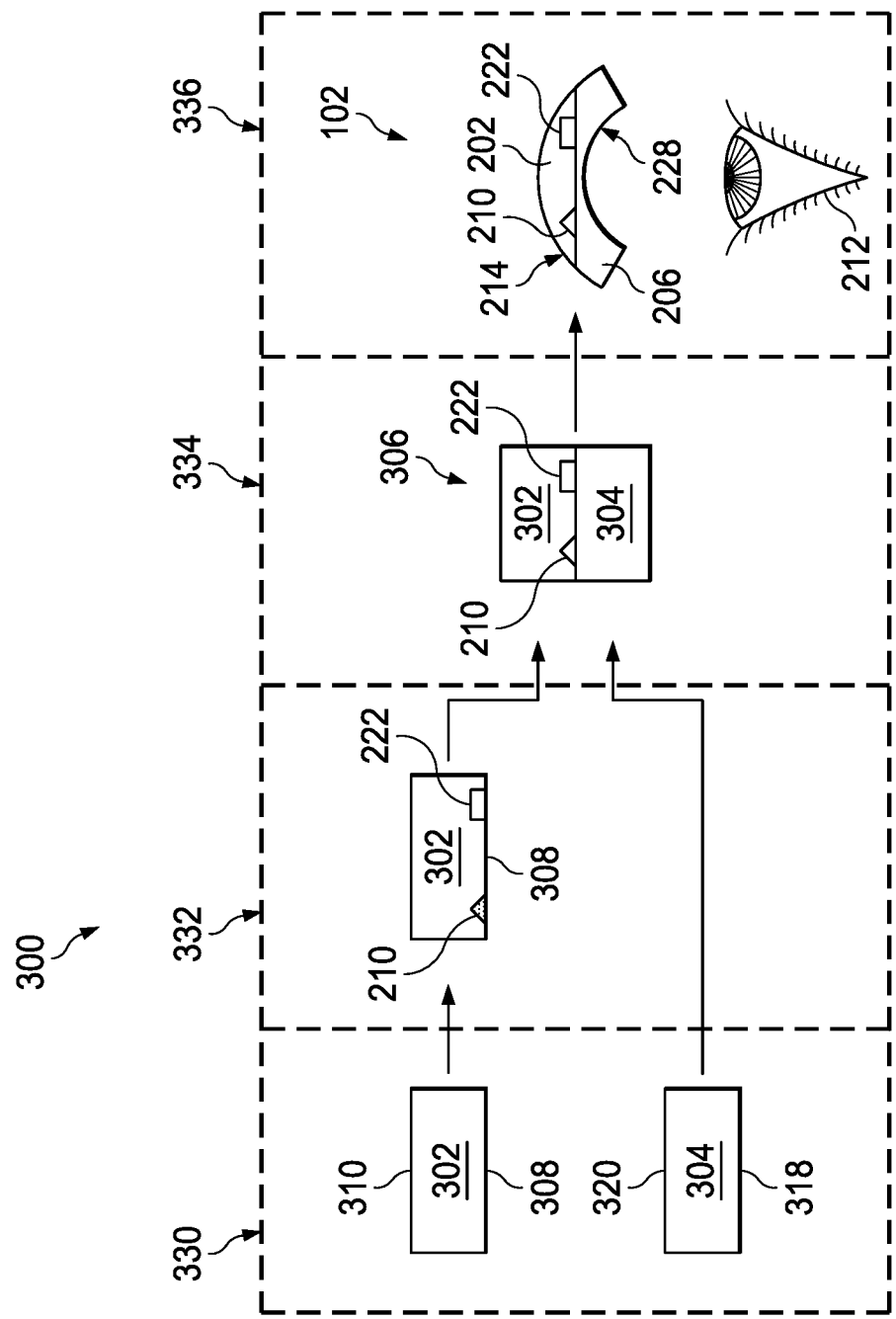
FIG. 3 is a block diagram of a method of manufacturing a lens, such as the lens illustrated in FIG. 2.

FIG. 3 is a block diagram of a method 300 of manufacturing a combiner, such as combiner 102 illustrated in FIG. 2. A first disc 302 and a second disc 304 or optical grade material, such as glass, polycarbonate, urethane-based prepolymer, or high-index plastic, is provided at block 330. The first disc has a first major surface or world-side surface 310 and a second major surface or eye-side surface 308. The second disc has a first major surface or world-side surface 320 and a second major surface or eye-side surface 318. At block 332, the first disc 302 is machined to create a freeform outcoupler feature 210 on the eye-side surface 308 of the first disc 302. The geometry, profile, and position of the machined outcoupler feature 210 are based on the ophthalmic corrective prescription specifications intended for the finalized lens, such as, for example, the diopter, lens size, lens shape, anticipated user eye position, and refractive index of the material(s) forming the first and second discs 302, 304. At block, 334, the first disc 302 is bonded to the second disc 304 in order form a blank 306. As described previously, the term "blank" refers to a piece of formed or layered material having a general size and shape that can be cut or ground into a lens utilizing standard optical lens manufacturing equipment. In the present example, the blank 306 is formed in the shape of a disc, however, in some embodiments, the blank is cuboid, spherical, or domed in shape.

At block 336, the blank 306, containing the freeform outcoupler feature 210 embedded between the first and second discs 302, 304 of material, is machined to form a lens, such as lens 102 of FIG. 2. The lens 102 has world-side surface 214 and eye-side surface 228 curvatures according to a corrective prescription specific to the eye of a user, in front of which the finalized lens will be worn. The world-side 204 curvature being formed from the world-side surface 310 of the first disc and the outcoupler feature 210 being located on the eye-side 308 surface of the first disc 302. Thus, the first disc 302 forms the lightguide 202 of the resulting lens 102, and the second disc 304 forms the corrective layer 206 of the lens.

In some embodiments, the outcoupler feature 210 is coated with a partial mirror coating to facilitate reflection of the display light out of the lightguide towards the user's eye. In some embodiments, the first disc 302 is also machined to include an incoupler feature 222 having a geometry, profile, and position based on the ophthalmic corrective prescription specifications intended for the finalized lens and at least one of the geometry, profile, and position of the outcoupler feature 210 formed thereon.

Figure 4:
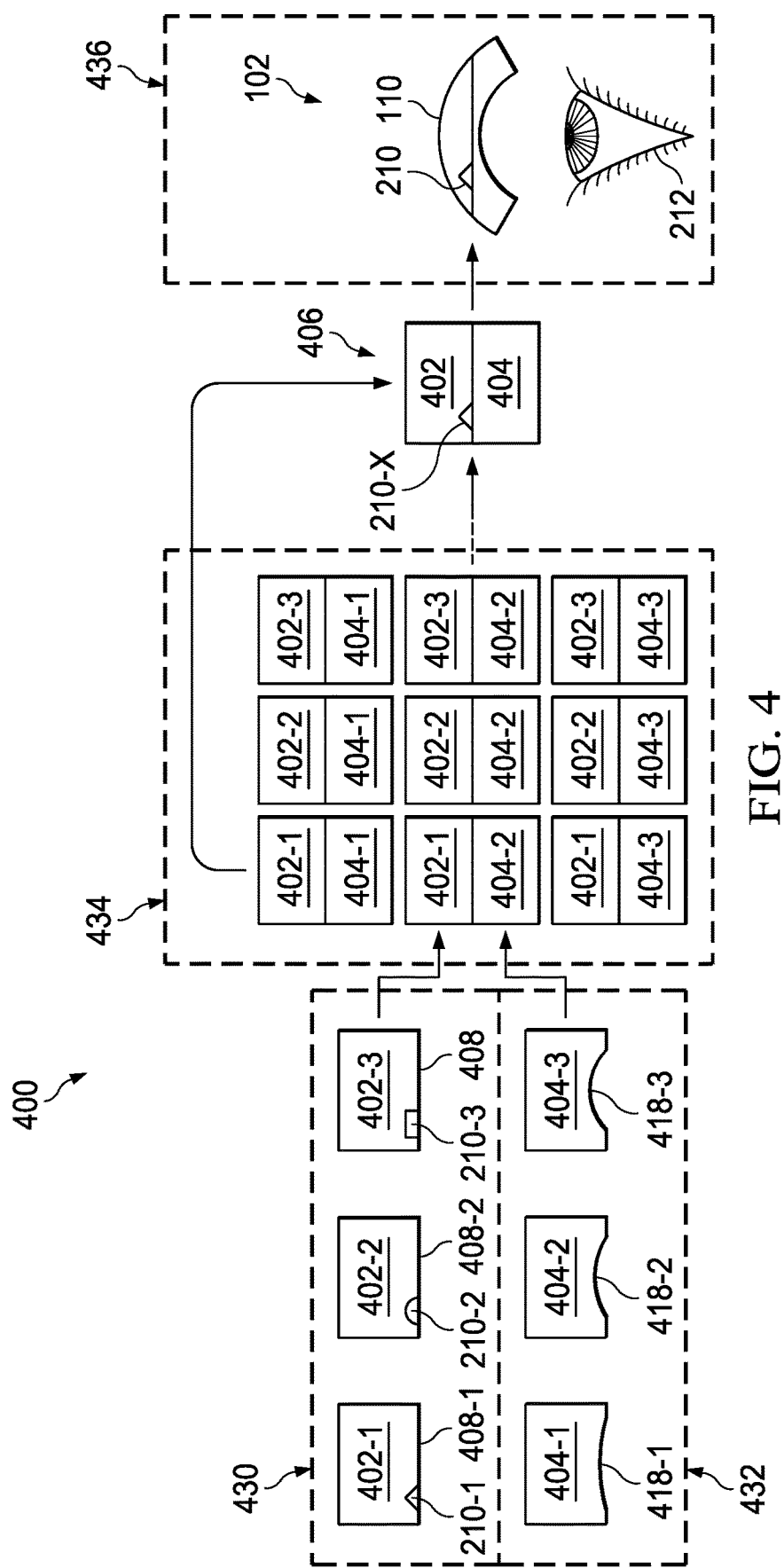
FIG. 4 is a block diagram of a shop-keeping unit (SKU) method of manufacturing a lens, such as the lens illustrated in FIG. 2.

FIG. 4 is a block diagram of a shop-keeping unit (SKU) method 400 of manufacturing a combiner, such as combiner 102 illustrated in FIG. 2, using discs of optical grade material having pre-formed features. By utilizing a combination of discs with pre-formed features, such as an outcoupler feature and/or a world-side curvature, efficient manufacturing of a wide range of prescriptions can be accomplished without having to machine the features for each lens and without having to keep a large inventory of pre-formed discs having features specific to each possible prescription.

As illustrated in FIG. 4, a set of first discs 402-1, 402-2, 402-3 (generically 402) is molded from an optical grade material, at block 430. Each of the first discs 402 in the set includes an outcoupler feature 210-1, 210-2, 210-3 (generically 210) molded on the eye-side surface 408-1, 408-2, 408-3 and having a geometry, profile, and position that is unique from the other first discs 402 in the set. The geometry, profile, and position of the molded outcoupler feature 210 for each of the first discs 402 in the set are based on the ophthalmic corrective prescription specifications intended for the finalized lens. In some embodiments, the geometry, profile, and position of the molded outcoupler feature 210 for each of the first discs 402 in the set is also based on the overall size and shape intended for the finalized lens, as well as dimensional aspects of the frame into which the finalized lens is intended to fit.

In some embodiments, the set of first discs 402 is also molded to include an incoupler feature 222 having a geometry, profile, and position based on the ophthalmic corrective prescription specifications intended for the finalized combiner and at least one of the geometry, profile, and position of the outcoupler feature formed thereon. At block 432, a set of second discs 404-1, 404-2, 404-3 (generically 404) is molded, each of which includes an eye-side surface 418-1, 418-2, 418-3 (generically 418) curvature that is unique from the other second discs 404 in the set.

At block 434, a first disc from the set of first discs 402 is bonded to a second disc of the set of second discs 404 in order to form a blank, 406-1 to 406-9 (generically 406). Thus, the resulting blank 406 contains at least a freeform outcoupler feature 210 embedded between the first and second discs 402, 404 of material. While FIG. 4 shows an example of three first discs 402 being combined in various combinations with three second discs 404 to produce nine unique blanks 406, it should be noted that any number of first discs 402 can be molded and combined with any number of second discs 404 to produce various blanks 406 having various combinations of features. At block 436, the world-side surface 410 of the blank 406 (i.e., the world-side surface 410 of the first disc 402) is machined to form a world-side 204 curvature. The radius of curvature to which the world-side surface 410 of the blank 406 is machine is based on the pre-molded eye-side 418 curvature of the blank 406 in order to achieve the proper diopter of the corrective prescription specific to the eye of a user, in front of which the final lens will be worn. That is, the world-side 204 curvature of the final lens is formed from the world-side surface 410 of the first disc 402 and the outcoupler feature 210 is located on the eye-side surface 408 of the first disc. Thus, the first disc 402 forms the lightguide 202 of the resulting combiner 102 and the second disc 404 forms the corrective layer 206 of the combiner 102. Through various combinations of first and second discs 402, 404, and machining of the world-side 204 curvature, a wide variety of prescription diopters can be achieved in the resulting lenses.

It should be noted that while the lenses and discs described herein and shown in FIGS. 2-4 are illustrated as concave lenses, such as those used to correct nearsightedness, the disclosed processes can also be utilized to produce to convex lenses, such as those used to correct farsightedness. The devices disclosed herein can also be configured to employ convex lenses.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A head mounted display (HMD) device comprising:
   a frame housing a micro-display to project display light;
   a lightguide configured to receive the display light from the micro-display, the lightguide further configured to have a first surface and a second surface opposing each other, the first surface exposed to a world-side environment and having a radius of curvature based on an ophthalmic corrective prescription, wherein the second surface is an eye-side surface having an outcoupler feature formed thereon; and
   a corrective layer having a world-side surface coupled to the second surface of the lightguide,
   wherein the coupled lightguide and corrective layer form a lens configured to fit within the frame.

2. The HMD device of claim 1, wherein an eye-side surface of the corrective layer has a radius of curvature based on the ophthalmic corrective prescription.

3. The HMD device of claim 2, wherein the radius of curvature of an eye-side of the corrective layer and the radius of curvature of the second surface of the lightguide, in combination, form a diopter of the ophthalmic corrective prescription.

4. The HMD device of claim 1, wherein a geometry, profile, and position of the outcoupler feature is based on predetermined ophthalmic corrective prescription specifications of the lens.

5. The HMD device of claim 4, further comprising:
   an incoupler feature formed on a surface of the lightguide during molding of the lightguide.

6. The HMD device of claim 1, wherein the outcoupler feature is configured to direct light out of the lightguide towards an eye-side of the corrective layer.

7. The HMD device of claim 6, further comprising:
   an incoupler feature machined on a surface of the lightguide prior to coupling the lightguide to the corrective layer.

8. A method comprising:
   forming an outcoupler feature on an eye-side surface of a first disc of optical material;
   bonding the eye-side surface of the first disc to a world-side surface of a second disc of optical material to form a blank having a world-side surface and an eye-side surface; and
   machining the world-side surface of the blank to have a radius of curvature corresponding to a user's ophthalmic corrective prescription so as to form a lens, wherein the first disc forms a lightguide portion at a world-side of the lens.

9. The method of claim 8, wherein a geometry, profile, and position of the outcoupler feature is based on predetermined ophthalmic corrective prescription specifications of the lens when finalized.

10. The method of claim 9, further comprising:
    forming an incoupler feature on a surface of the first disc, wherein the geometry, profile, and position of the incoupler feature is based on predetermined ophthalmic corrective prescription specifications of the lens when finalized and at least one of the geometry, profile, and position of the outcoupler feature.

11. The method of claim 8, further comprising:
    molding the second disc to have an eye-side surface with a radius of curvature corresponding to the user's ophthalmic corrective prescription on the eye-side surface of the blank.

12. The method of claim 8, further comprising:
    machining an eye-side surface of the second disc to a radius of curvature corresponding to the user's ophthalmic corrective prescription on the eye-side surface of the blank.

13. The method of claim 8, wherein the second disc forms a corrective layer of the lens.

14. The method of claim 8, wherein the outcoupler feature is formed by machining the eye-side surface of the first disc.

15. The method of claim 8, further comprising:
    molding the first disc to include the outcoupler feature on the eye-side surface of the first disc.

16. An apparatus comprising:
    a lightguide having a first surface and a second surface opposing each other, the first surface exposed to a world-side environment and having a radius of curvature based on an ophthalmic corrective prescription, wherein the second surface is an eye-side surface having an outcoupler feature formed thereon; and
    a corrective layer having a world-side surface directly coupled to the second surface of the lightguide,
    wherein the coupled lightguide and corrective layer are configured to fit within a support structure to be worn by a user.

17. The apparatus of claim 16, wherein an eye-side surface of the corrective layer has a radius of curvature based on the ophthalmic corrective prescription when combined with the radius of curvature of the first surface of the lightguide.

18. The apparatus of claim 16, wherein a geometry, profile, and position of the outcoupler feature is based on predetermined ophthalmic corrective prescription specifications of a lens formed by the coupled lightguide and corrective layer when finalized.

19. The apparatus of claim 16, wherein the outcoupler feature is formed during molding of the lightguide.

20. The apparatus of claim 19, further comprising:
    an incoupler feature formed on a surface of the lightguide during molding of the lightguide.

* * * * *